(12) United States Patent
Watanabe et al.

(10) Patent No.: US 9,433,832 B2
(45) Date of Patent: *Sep. 6, 2016

(54) MULTI-PIECE SOLID GOLF BALL

(71) Applicant: Bridgestone Sports Co., Ltd., Tokyo (JP)

(72) Inventors: Hideo Watanabe, Chichibushi (JP); Atsuki Kasashima, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/792,863

(22) Filed: Jul. 7, 2015

(65) Prior Publication Data

US 2016/0008667 A1   Jan. 14, 2016

(30) Foreign Application Priority Data

Jul. 8, 2014   (JP) .................................. 2014-140671

(51) Int. Cl.
  *A63B 37/02*   (2006.01)
  *A63B 37/00*   (2006.01)
  *C08K 5/098*   (2006.01)

(52) U.S. Cl.
  CPC .......... *A63B 37/0092* (2013.01); *A63B 37/004* (2013.01); *A63B 37/0039* (2013.01); *A63B 37/0076* (2013.01); *A63B 37/0084* (2013.01); *A63B 37/0087* (2013.01); *C08K 5/098* (2013.01); *A63B 37/0033* (2013.01); *A63B 37/0035* (2013.01); *A63B 37/0045* (2013.01); *A63B 37/0047* (2013.01); *A63B 37/0068* (2013.01)

(58) Field of Classification Search
  CPC .......... A63B 37/0092; A63B 37/0039; A63B 37/0084; A63B 37/0076; A63B 37/0087
  See application file for complete search history.

(56) References Cited

U.S. PATENT DOCUMENTS

| | | | |
|---|---|---|---|
| 6,194,505 B1 | 2/2001 | Sone et al. | |
| 6,642,314 B2 | 11/2003 | Sone et al. | |
| 6,743,122 B2 | 6/2004 | Hayashi et al. | |
| 6,923,735 B1* | 8/2005 | Hayashi ............. | A63B 37/0003 473/376 |
| 7,294,680 B2 | 11/2007 | Sone et al. | |

(Continued)

FOREIGN PATENT DOCUMENTS

| | | |
|---|---|---|
| JP | 11-35633 A | 2/1999 |
| JP | 11-164912 A | 6/1999 |

(Continued)

OTHER PUBLICATIONS

Compressions by any other name—J. Dalton.*

*Primary Examiner* — John E Simms, Jr.
(74) *Attorney, Agent, or Firm* — Sughrue Mion, PLLC

(57) ABSTRACT

In a multi-piece solid golf ball having a core, an envelope layer, an intermediate layer and a cover, the surface hardnesses of the respective layers are set so as to satisfy specific relationships. Also, the initial velocities measured for the core, for a sphere obtained by forming the envelope layer over the core (envelope layer-encased sphere), for a sphere obtained by forming the envelope layer and the intermediate layer over the core (intermediate layer-encased sphere) and for the ball are set so as to satisfy specific relationships. In addition, the deflection (mm) of the ball when compressed under a given load and the deflection (mm) of the intermediate layer-encased sphere when compressed under a given load are set so as satisfy a specific relationship.

14 Claims, 1 Drawing Sheet

(56) References Cited

U.S. PATENT DOCUMENTS

Figure 1:
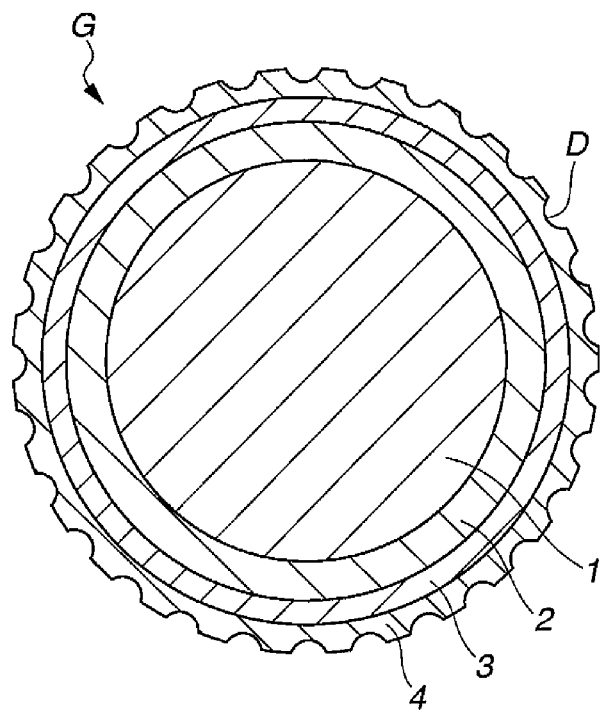

| | | | |
|---|---|---|---|
| 8,414,425 B2 | 4/2013 | Kasashima et al. | |
| 2002/0006838 A1* | 1/2002 | Hayashi | A63B 37/0003 473/370 |
| 2005/0164809 A1* | 7/2005 | Watanabe | A63B 37/0003 473/371 |
| 2006/0172823 A1* | 8/2006 | Loper | A63B 37/0003 473/371 |
| 2008/0305890 A1* | 12/2008 | Watanabe | A63B 37/0063 473/373 |
| 2010/0273575 A1* | 10/2010 | Watanabe | A63B 37/0003 473/373 |

FOREIGN PATENT DOCUMENTS

| | | |
|---|---|---|
| JP | 2000-061000 A | 2/2000 |
| JP | 2000-061001 A | 2/2000 |
| JP | 2002-293996 A | 10/2002 |
| JP | 2011-092708 A | 5/2011 |

* cited by examiner

MULTI-PIECE SOLID GOLF BALL

CROSS-REFERENCE TO RELATED APPLICATION

This non-provisional application claims priority under 35 U.S.C. §119(a) on Patent Application No. 2014-140671 filed in Japan on Jul. 8, 2014, the entire contents of which are hereby incorporated by reference.

BACKGROUND OF THE INVENTION

1. Field of the Invention

The present invention relates to a multi-piece solid golf ball having a core, an envelope layer, an intermediate layer and a cover. The invention relates in particular to a multi-piece solid golf ball which exhibits an excellent flight performance not only in the mid head-speed range, but also in the low head-speed range, and which moreover is endowed with both a good feel at impact and an excellent durability to repeated impact.

2. Prior Art

Numerous golf balls which are capable of achieving an excellent flight performance and excellent spin properties when hit at high head speeds and of providing a good feel at impact have hitherto been developed in order to address the needs of professional golfers and skilled amateurs. However, because such balls are generally designed so as to achieve an ideal amount of deformation when struck at a high head speed, amateur golfers having a low head speed are often unable to impart sufficient deformation to the ball. Hence, the inherent performance of such balls cannot be exhibited when played by low head-speed golfers, as a result of which the balls fail to travel a sufficient distance or have a poor feel at impact.

Developing a golf ball to which even a low head-speed golfer can impart sufficient deformation and which has an excellent flight performance and a good feel at impact is thus important for expanding the golfer base.

Prior-art publications relating to the invention include JP-A 2011-092708, JP-A 2000-61001 and JP-A 2000-61000.

It is therefore an object of the present invention to provide a multi-piece solid golf ball which is capable of exhibiting an excellent flight performance, not only when played by mid head-speed golfers, but even when played by low head-speed golfers, and which moreover has both a good feel at impact and an excellent durability to repeated impact.

SUMMARY OF THE INVENTION

We have discovered that, in a golf ball having a core, an envelope layer, an intermediate layer and a cover, by setting the surface hardnesses of these respective layers and also setting the respective initial velocities measured for the core, a sphere obtained by encasing the core with the envelope layer (envelope layer-encased sphere), a sphere obtained by encasing the core with the envelope layer and the intermediate layer (intermediate layer-encased sphere), and the ball itself so as to satisfy certain specific relationships, and furthermore by setting the deflection (mm) of the ball when compressed under a given load and the deflection (mm) of the intermediate layer-encased sphere when compressed under a given load so as to satisfy a specific relationship, the ball is able to exhibit an excellent flight performance not only in the mid head-speed range, but even in the low head-speed range. We have also found that, by optimizing the materials used to form the envelope layer, the intermediate layer and the cover over the core, a multi-piece solid golf ball endowed with both a good feel at impact and excellent durability to repeated impact can be obtained.

Accordingly, the invention provides a multi-piece solid golf ball having a core, an envelope layer, an intermediate layer and a cover, wherein the core, envelope layer, intermediate layer and cover have respective surface hardnesses which satisfy the relationship:

core surface hardness>envelope layer surface hardness<intermediate layer surface hardness<cover surface hardness;

the surface hardness of the core and the surface hardness of the envelope layer, expressed in terms of Shore D hardness, satisfy the relationship:

$-40 \leq$(envelope layer surface hardness–core surface hardness)$\leq -5$;

the surface hardness of the intermediate layer and the surface hardness of the cover, expressed in terms of Shore D hardness, satisfy the relationship:

$5 \leq$(cover surface hardness–intermediate layer surface hardness)$\leq 15$;

the ball and a sphere composed of the core covered peripherally by the envelope layer and the intermediate layer (intermediate layer-encased sphere) have respective initial velocities (m/s) which satisfy the relationship:

$-1.0$ m/s$\leq$(ball initial velocity–intermediate layer-encased sphere initial velocity)$\leq 0$ m/s;

the intermediate layer-encased sphere and a sphere composed of the core covered peripherally by the envelope layer (envelope layer-encased sphere) have respective initial velocities (m/s) which satisfy the relationship:

$-0.2$ m/s$\leq$(intermediate layer-encased sphere initial velocity–envelope layer-encased sphere initial velocity);

and
the ball satisfies the relationship:

$0.86 \leq A/B \leq 0.98$, where A is the deflection (mm) of the ball when compressed under a final load of 1,275 N (130 kgf) from an initial load of 98 N (10 kgf) and B is the deflection (mm) of the intermediate layer-encased sphere when compressed under a final load of 1,275 N (130 kgf) from an initial load of 98 N (10 kgf).

In a preferred embodiment of the multi-piece solid golf ball of the invention, the initial velocity (m/s) of the core and the initial velocity (m/s) of the ball satisfy the relationship:

$-1.0$ m/s$\leq$(ball initial velocity–core initial velocity)$\leq 0$ m/s.

In another preferred embodiment of the inventive multi-piece solid golf ball, the surface hardness of the envelope layer and the surface hardness of the intermediate layer, expressed in terms of Shore D hardness, satisfy the relationship:

$10 \leq$(intermediate layer surface hardness–envelope layer surface hardness)$\leq 50$.

In yet another preferred embodiment of the inventive multi-piece solid golf ball, the initial velocity (m/s) of the envelope layer-encased sphere and the initial velocity (m/s) of the ball satisfy the relationship:

$-0.4$ m/s$\leq$(ball initial velocity–envelope layer-encased sphere initial velocity)$\leq 0.4$ m/s, and the initial velocity (m/s) of the core and the initial velocity (m/s) of the ball satisfy the relationship:

−0.8 m/s≤(ball initial velocity−core initial velocity) ≤0 m/s.

In a further preferred embodiment of the invention, the envelope layer, the intermediate layer and the cover have respective thicknesses which satisfy the relationships:

envelope layer thickness≤cover thickness, and intermediate layer thickness≤cover thickness.

In a still further preferred embodiment of the invention, the intermediate layer and the cover have respective specific gravities which satisfy the relationship:

cover specific gravity≥intermediate layer specific gravity.

In another preferred embodiment, the intermediate layer of the inventive multi-piece solid golf ball is formed of a resin composition obtained by blending as essential components:
100 parts by weight of a resin component composed of, in admixture,
(A) a base resin of (a-1) an olefin-unsaturated carboxylic acid random copolymer and/or a metal ion neutralization product of an olefin-unsaturated carboxylic acid random copolymer mixed with (a-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and
(B) a non-ionomeric thermoplastic elastomer
in a weight ratio between 100:0 and 50:50;
(C) from 5 to 80 parts by weight of a fatty acid and/or fatty acid derivative having a molecular weight of from 228 to 1500; and
(D) from 0.1 to 17 parts by weight of a basic inorganic metal compound capable of neutralizing un-neutralized acid groups in components A and C.

In yet another preferred embodiment, the envelope layer of the multi-piece solid golf ball of the invention is formed of a thermoplastic polyether ester elastomer.

In still yet another preferred embodiment, the cover of the multi-piece solid golf ball of the invention is formed of a resin composition obtained by blending together an ionomer resin and a granular inorganic filler.

This invention makes it possible to obtain multi-piece solid golf balls which are capable of exhibiting an excellent flight performance not only when struck by mid head-speed golfers, but even when struck by low head-speed golfers, and which moreover have both a good feel at impact and an excellent durability to repeated impact.

BRIEF DESCRIPTION OF THE DIAGRAMS

Figure 2:
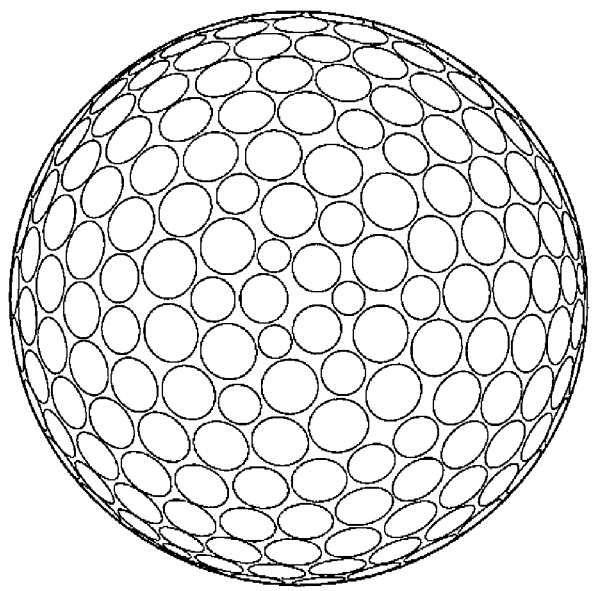

FIG. 1 is a schematic cross-sectional diagram showing the structure of a golf ball according to the invention.
FIG. 2 is a top view showing the dimple pattern used on the balls in the examples.

DETAILED DESCRIPTION OF THE INVENTION

The objects, features and advantages of the invention will become more apparent from the following detailed description, taken in conjunction with the foregoing diagrams.

The multi-piece solid golf ball of the invention has, arranged in order from the inside of the golf ball: a solid core, an envelope layer, an intermediate layer and a cover. FIG. 1 shows the structure of the inventive golf ball. Referring to FIG. 1, the golf ball G has a core 1, an envelope layer 2 which encases the core 1, an intermediate layer 3 which encases the envelope layer 2, and a cover 4 which encases the intermediate layer 3. Numerous dimples D are generally formed on the surface of the cover 4 in order to improve the aerodynamic properties. Each of these layers is described in detail below.

In this specification, "mid head speed" refers to a golf club head speed of generally from about 36 m/s to about 44 m/s when the ball is struck with a driver (W#1), and "low head speed" refers to a golf club head speed of generally from about 25 m/s to about 35 m/s.

In the practice of the invention, the solid core may be formed using a known rubber composition. Although not particularly limited, preferred examples include rubber compositions formulated as shown below.

A material composed primarily of rubber may be used to form the core. For example, the core may be formed using a rubber composition which includes a base rubber and also such ingredients as a co-crosslinking agent, an organic peroxide, an inert filler, sulfur, an antioxidant and an organosulfur compound.

The use of polybutadiene as the base rubber in the rubber composition is preferred. This polybutadiene may be one having a cis-1,4 bond content on the polymer chain of preferably at least 80 wt %, more preferably at least 90 wt %, and even more preferably at least 95 wt %. If the content of cis-1,4 bonds among the bonds on the polybutadiene molecule is too low, the resilience may decrease. The content of 1,2-vinyl bonds included on the polybutadiene is preferably not more than 2 wt %, more preferably not more than 1.7 wt %, and even more preferably not more than 1.5 wt %, of the polymer chain. If the content of 1,2-vinyl bonds is too high, the resilience may decrease.

To obtain a molded and vulcanized rubber composition having a good resilience, the polybutadiene used in the invention is preferably one synthesized with a rare-earth catalyst or a Group VIII metal compound catalyst. Polybutadiene synthesized with a rare-earth catalyst is especially preferred.

Such rare-earth catalysts are not subject to any particular limitation. Exemplary rare-earth catalysts include those made up of a combination of a lanthanide series rare-earth compound with an organoaluminum compound, an alumoxane, a halogen-bearing compound and an optional Lewis base.

Examples of suitable lanthanide series rare-earth compounds include halides, carboxylates, alcoholates, thioalcoholates and amides of atomic number 57 to 71 metals.

In the practice of the invention, the use of a neodymium catalyst in which a neodymium compound serves as the lanthanide series rare-earth compound is particularly advantageous because it enables a polybutadiene rubber having a high cis-1,4 bond content and a low 1,2-vinyl bond content to be obtained at an excellent polymerization activity. Suitable examples of such rare-earth catalysts include those mentioned in JP-A 11-35633, JP-A 11-164912 and JP-A 2002-293996.

To increase the resilience, it is preferable for the polybutadiene synthesized using the lanthanide series rare-earth compound catalyst to account for at least 10 wt %, preferably at least 20 wt %, and more preferably at least 40 wt %, of the rubber components.

Rubber components other than the above polybutadiene may be included in the rubber composition, insofar as the objects of the invention are attainable. Illustrative examples of rubber components other than the above polybutadiene include other polybutadienes and also other diene rubbers, such as styrene-butadiene rubber, natural rubber, isoprene rubber and ethylene-propylene-diene rubber.

Examples of co-crosslinking agents include unsaturated carboxylic acids and the metal salts of unsaturated carboxylic acids.

Specific examples of unsaturated carboxylic acids include acrylic acid, methacrylic acid, maleic acid and fumaric acid. Acrylic acid and methacrylic acid are especially preferred.

The metal salts of unsaturated carboxylic acids, while not subject to any particular limitation, are exemplified by the above-mentioned unsaturated carboxylic acids neutralized with desired metal ions. Specific examples include the zinc and magnesium salts of methacrylic acid and acrylic acid. The use of zinc acrylate is especially preferred.

The unsaturated carboxylic acid and/or metal salt thereof is included in an amount, per 100 parts by weight of the base rubber, which is preferably at least 5 parts by weight, more preferably at least 10 parts by weight, and even more preferably at least 15 parts by weight. The amount included is preferably not more than 60 parts by weight, more preferably not more than 50 parts by weight, even more preferably not more than 40 parts by weight, and most preferably not more than 30 parts by weight. Too much may make the core too hard, giving the ball an unpleasant feel at impact, whereas too little may lower the rebound.

The organic peroxide may be a commercially available product, suitable examples of which include Percumyl D (available from NOF Corporation), Perhexa 3M (NOF Corporation), Perhexa C40 (NOF Corporation) and Luperco 231XL (Atochem Co.). The use of one of these alone is preferred.

The amount of organic peroxide included per 100 parts by weight of the base rubber is preferably at least 0.1 part by weight, more preferably at least 0.3 part by weight, even more preferably at least 0.5 part by weight, and most preferably at least 0.7 part by weight. The upper limit in the amount included is preferably not more than 5 parts by weight, more preferably not more than 4 parts by weight, even more preferably not more than 3 parts by weight, and most preferably not more than 2 parts by weight. Too much or too little organic peroxide may make it impossible to achieve a ball having a good feel, durability and rebound.

Examples of suitable inert fillers include zinc oxide, barium sulfate and calcium carbonate. These may be used singly or as a combination of two or more thereof.

The amount of inert filler included per 100 parts by weight of the base rubber is preferably at least 1 part by weight, and more preferably at least 5 parts by weight. The upper limit in the amount included is preferably not more than 100 parts by weight, more preferably not more than 80 parts by weight, and even more preferably not more than 60 parts by weight. Too much or too little inert filler may make it impossible to achieve a proper weight and a good rebound.

In addition, an antioxidant may be included if necessary. Illustrative examples of suitable commercial antioxidants include Nocrac NS-6, Nocrac NS-30 and Nocrac 200 (all available from Ouchi Shinko Chemical Industry Co., Ltd.), and Yoshinox 425 (available from Yoshitomi Pharmaceutical Industries, Ltd.). These may be used singly or as a combination of two or more thereof.

The amount of antioxidant included can be set to more than 0, and may be set to an amount per 100 parts by weight of the base rubber which is preferably at least 0.05 part by weight, and more preferably at least 0.1 part by weight. The maximum amount included, although not subject to any particular limitation, may be set to an amount per 100 parts by weight of the base rubber which is preferably not more than 3 parts by weight, more preferably not more than 2 parts by weight, even more preferably not more than 1 part by weight, and most preferably not more than 0.5 part by weight. Too much or too little antioxidant may make it impossible to achieve a suitable core hardness gradient, a good rebound and durability, and a spin rate-lowering effect on full shots.

In the practice of the invention, an organosulfur compound may be optionally included in the rubber composition in order to enhance the core rebound. In cases where an organosulfur compound is included, the content thereof per 100 parts by weight of the base rubber may be set to preferably at least 0.05 part by weight, and more preferably at least 0.1 part by weight. The upper limit in the amount of organosulfur compound included is preferably not more than 5 parts by weight, more preferably not more than 4 parts by weight, and even more preferably not more than 2 parts by weight. Including too little organosulfur compound may make it impossible to obtain a sufficient core rebound-increasing effect. On the other hand, if too much is included, the core hardness may become too low, worsening the feel of the ball on impact, and the durability of the ball to cracking when repeatedly struck may worsen.

The rubber composition containing the various above ingredients is prepared by mixture using a typical mixing apparatus, such as a Banbury mixer or a roll mill. When this rubber composition is used to mold the core, molding may be carried out by compression molding or injection molding using a specific mold for molding cores. The resulting molded body is then heated and cured under temperature conditions sufficient for the organic peroxide and co-crosslinking agent included in the rubber composition to act, thereby giving a core having a specific hardness profile. The vulcanization conditions in this case, while not subject to any particular limitation, are generally set to a temperature of about 130 to 170° C., and especially 150 to 160° C., and a time of 10 to 40 minutes, and especially 12 to 20 minutes.

The core diameter, although not subject to any particular limitation, may be set to from 30 to 40 mm. In this case, the lower limit is preferably at least 32 mm, more preferably at least 34 mm, and even more preferably at least 35 mm. The upper limit may be set to preferably not more than 39 mm, more preferably not more than 38 mm, and even more preferably not more than 36 mm.

The core has a center hardness, expressed as the JIS-C hardness, which, although not particularly limited, may be set to preferably at least 50, more preferably at least 52, and even more preferably at least 54. The upper limit in the JIS-C hardness may be set to preferably not more than 63, more preferably not more than 60, and even more preferably not more than 58. The center hardness of the core, expressed in terms of the Shore D hardness, is preferably at least 30, more preferably at least 32, and even more preferably at least 33. The upper limit is preferably not more than 40, more preferably not more than 38, and even more preferably not more than 36. If the center hardness of the core is too low, the durability to cracking under repeated impact may worsen. On the other hand, if the center hardness of the core is too high, the spin rate may rise excessively, resulting in a poor distance.

The core has a surface hardness, expressed as the JIS-C hardness, which, although not particularly limited, may be set to preferably at least 63, more preferably at least 68, and even more preferably at least 70. The upper limit in the JIS-C hardness may be set to preferably not more than 83, more preferably not more than 78, and even more preferably not more than 75. The surface hardness of the core, expressed in terms of the Shore D hardness, is preferably at least 40, more preferably at least 44, and even more preferably at least 45. The upper limit is preferably not more than 55, more preferably not more than 51, and even more preferably not more than 49. If the surface hardness of the core is too low, the spin rate may rise excessively or the rebound may decrease, resulting in a poor distance. On the other hand, if the surface hardness of the core is too high, the feel of the ball at impact may become too hard or the durability to cracking under repeated impact may worsen.

Here, "center hardness" refers to the hardness measured at the center of a cross-section obtained by cutting the core in half through the center, and "surface hardness" refers to the hardness measured at the surface of the core (spherical surface).

The cross-sectional hardness at a position midway between the center and the surface of the core, expressed as the JIS-C hardness, although not particularly limited, may be set to preferably at least 55, more preferably at least 58, and even more preferably at least 61. The upper limit in the JIS-C hardness is preferably not more than 70, more preferably not more than 67, and even more preferably not more than 65. This cross-sectional hardness, expressed as the Shore D hardness, is preferably at least 34, more preferably at least 36, and even more preferably at least 38. The upper limit is preferably not more than 45, more preferably not more than 43, and even more preferably not more than 41. In cases where the cross-sectional hardness falls outside of the suitable range, the spin rate of the ball may rise, which may result in a poor distance, and the durability of the ball to cracking under repeated impact may worsen.

In this invention, the hardness difference between the center and surface of the core, expressed in terms of JIS-C hardness, although not particularly limited, may be set to preferably at least 10, more preferably at least 12, and even more preferably at least 14. The upper limit, expressed in terms of JIS-C hardness, may be set to preferably not more than 30, more preferably not more than 25, and even more preferably not more than 20. This hardness difference, expressed in terms of Shore D hardness, is preferably at least 8, more preferably at least 10, and even more preferably at least 11. The upper limit is preferably not more than 23, more preferably not more than 19, and even more preferably not more than 15. When this hardness difference is too small, the spin rate-lowering effect on shots with a driver (W#1) is inadequate, as a result of which a good distance may not be achieved. On the other hand, if the hardness difference is too large, the initial velocity on actual shots may become low, as a result of which a good distance may not be achieved, or the durability to cracking on repeated impact may worsen.

The core has a deflection when compressed under a final load of 1,275 N (130 kgf) from an initial load of 98 N (10 kgf) which, although not particularly limited, may be set within the range of from 3.0 to 8.0 mm. The lower limit may be set to preferably at least 3.5 mm, and more preferably at least 4.2 mm. The upper limit may be set to preferably not more than 6.5 mm, and more preferably not more than 5.5 mm. If the core is harder than the above range (i.e., if the deflection is too small), the spin rate may rise excessively, resulting in a poor distance, or the feel of the ball at impact may be too hard. On the other hand, if the core is softer than the above range (i.e., if the deflection is too large), the rebound may become too low, resulting in a poor distance, the feel of the ball may become too soft, or the durability to cracking on repeated impact may worsen.

The core has a specific gravity which, although not particularly limited, may be set within the range of from 1.02 to 1.40. The lower limit is preferably at least 1.10, and more preferably at least 1.15. The upper limit may be set to not more than 1.30, and more preferably not more than 1.20.

In this invention, by using the above material to form the solid core, the rebound can be increased, thus making it possible to provide a golf ball that is capable of achieving a stable trajectory.

The core structure is not limited to a single layer, and may be a multilayer structure of two or more layers. By giving the core a multilayer structure, the spin rate on shots with a driver can be lowered, enabling the distance to be increased even further. In addition, the spin properties and feel of the ball at the time of impact can also be improved. In such cases, the core has at least an inner core layer (inner sphere) and an outer core layer.

Next, the envelope layer formed over the core is described.

A known resin may be used as the material that forms the envelope layer, and is not particularly limited, although use may be made of one, two or more selected from the group consisting of ionomer resins and urethane, amide, ester, olefin and styrene-based thermoplastic elastomers. In this invention, because a high rebound can be obtained within the desired hardness range, especially preferred use can be made of a thermoplastic polyether ester elastomer.

The envelope layer has a material hardness, expressed as the Shore D hardness, which, although not particularly limited, can be set to generally at least 15, preferably at least 20, and more preferably at least 25. The upper limit in the Shore D hardness can be set to generally not more than 40, preferably not more than 35, and more preferably not more than 30. Here and below, "material hardness" refers to the hardness measured for a test specimen obtained by molding the material to be measured into a sheet of a specific thickness and using a type D durometer in accordance with ASTM D2240.

The sphere obtained by peripherally covering the core with an envelope layer (envelope layer-encased sphere) has a surface hardness, expressed as the Shore D hardness, which, although not particularly limited, may be set to generally at least 21, preferably at least 26, and more preferably at least 31. The upper limit may be set to generally not more than 46, preferably not more than 41, and more preferably not more than 36.

If the material hardness and the surface hardness are too low, the spin rate of the ball on full shots may rise excessively, resulting in a poor distance, and the durability of the ball to cracking on repeated impact may worsen. On the other hand, if the material hardness and the surface hardness are too high, the durability to cracking on repeated impact may worsen or the spin rate on full shots may rise, resulting in a poor distance, particularly on shots taken at a low head speed. In addition, the feel of the ball at impact may worsen.

The envelope layer has a thickness which, although not particularly limited, may be set to preferably at least 0.6 mm, more preferably at least 0.8 mm, and even more preferably at least 1.1 mm. The upper limit may be set to preferably not more than 2.1 mm, more preferably not more than 1.6 mm, and even more preferably not more than 1.4 mm. If the envelope layer is too thin, the durability of the ball to cracking on repeated impact may worsen and the feel of the ball at impact may worsen. On the other hand, if the envelope layer is too thick, the spin rate may rise on full shots, possibly resulting in a poor distance.

The envelope layer-encased sphere has a deflection, when compressed under a final load of 1,275 N (130 kgf) from an initial load of 98 N (10 kgf), which, although not particularly limited, may be set within the range of 2.5 to 7.6 mm. The lower limit may be set to preferably at least 3.0 mm, and more preferably at least 3.8 mm. The upper limit may be set to preferably not more than 5.7 mm, and more preferably not more than 4.7 mm. If the envelope layer-encased sphere is harder than the above range (i.e., the deflection is too small), the spin rate of the ball on full shots may rise excessively, resulting in a poor distance, or the feel of the ball at impact may be too hard. On the other hand, if the envelope layer-encased sphere is softer than the above range (i.e., the deflection is too large), the feel of the ball at impact may be too soft or the durability to cracking on repeated impact may worsen.

Next, the intermediate layer formed over the envelope layer is described.

The material used to form the intermediate layer may be a known resin and is not subject to any particular limitation, although a preferred example of the material is a resin composition obtained by blending, as essential components: 100 parts by weight of a resin component composed of, in admixture, (A) a base resin of (a-1) an olefin-unsaturated carboxylic acid random copolymer and/or a metal ion neutralization product of an olefin-unsaturated carboxylic acid random copolymer mixed with (a-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and (B) a non-ionomeric thermoplastic elastomer
in a weight ratio between 100:0 and 50:50;

(C) from 5 to 80 parts by weight of a fatty acid and/or fatty acid derivative having a molecular weight of from 228 to 1500; and (D) from 0.1 to 17 parts by weight of a basic inorganic metal compound capable of neutralizing un-neutralized acid groups in components A and C.

The components (A) to (D) of the intermediate layer-forming resin material described in JP-A 2010-253268 may be advantageously used as above components (A) to (D).

The method of forming the intermediate layer is not subject to any particular limitation, and may be a known method such as one that entails placing a pre-fabricated envelope layer-encased sphere inside a mold, and injection-molding over the sphere the intermediate layer-forming material prepared as described above.

The intermediate layer-forming material has a material hardness which, although not particularly limited, may be set to a Shore D hardness of generally at least 40, preferably at least 45, and more preferably at least 47. The upper limit, expressed as the Shore D hardness, may be set to generally not more than 60, preferably not more than 55, and more preferably not more than 53.

The sphere obtained by peripherally covering the core with an envelope layer and an intermediate layer (intermediate layer-encased sphere) has a surface hardness, expressed as the Shore D hardness, which, although not particularly limited, may be set to generally at least 46, preferably at least 51, and more preferably at least 53. The upper limit may be set to generally not more than 66, preferably not more than 61, and more preferably not more than 59.

If the material hardness and the surface hardness are too low, the spin rate of the ball on full shots may rise excessively, resulting in a poor distance, or the durability of the ball to cracking on repeated impact may worsen. On the other hand, if the material hardness and the surface hardness are too high, the durability to cracking on repeated impact may worsen, the spin rate on full shots may rise, resulting in a poor distance, or the feel of the ball at impact may worsen.

The intermediate layer has a thickness which, although not particularly limited, may be set to preferably at least 0.6 mm, more preferably at least 0.8 mm, and even more preferably at least 1.1 mm. The upper limit may be set to preferably not more than 2.1 mm, more preferably not more than 1.6 mm, and even more preferably not more than 1.4 mm. If the intermediate layer is too thin, the durability to cracking on repeated impact may worsen, or the feel of the ball at impact may worsen. On the other hand, if the intermediate layer is too thick, the spin rate may rise on full shots, resulting in a poor distance.

The intermediate layer-encased sphere has a deflection, when compressed under a final load of 1,275 N (130 kgf) from an initial load of 98 N (10 kgf), which, although not particularly limited, may be set within the range of 2.3 to 7.4 mm. The lower limit may be set to preferably at least 2.8 mm, and more preferably at least 3.5 mm. The upper limit may be set to preferably not more than 5.6 mm, and more preferably not more than 4.6 mm. If the intermediate layer-encased sphere is harder than the above range (i.e., the deflection is too small), the spin rate on full shots may rise excessively, resulting in a poor distance, or the feel of the ball at impact may be too hard. On the other hand, if the intermediate layer-encased sphere is softer than the above range (i.e., the deflection is too large), the feel at impact may be too soft or the durability to cracking on repeated impact may worsen.

The structure of the above-described intermediate layer is not limited to a single layer; where necessary, two or more like or unlike intermediate layers may be formed within the above-described range. By forming the intermediate layer as a plurality of layers, the spin rate on shots with a driver can be raised or lowered so as to further increase the distance. Moreover, the spin performance and feel of the ball at impact can be further improved.

Next, the material that forms the cover of the inventive golf ball is described. In this invention, it is preferable for an ionomer resin to be used as the chief material in the cover and to additionally include a specific granular inorganic filler as a reinforcement. These materials are described in detail below.

The ionomer resin is not subject to any particular limitation, and may be a known product. Commercial products that may be used as the ionomer resin include, for example, H1706, H1605, H1557, H1601, AM7329, AM7317 and AM7318, all of which are available from DuPont-Mitsui Polychemicals Co.

The granular inorganic filler is an ingredient that is included as a reinforcement. Although not subject to any particular limitation, suitable use can be made of, for example, zinc oxide, barium sulfate or titanium dioxide.

The granular inorganic filler has an average particle diameter which, although not particularly limited, may be set to preferably from 0.01 to 100 μm, and more preferably from 0.1 to 10 μm. If the average particle diameter of the granular inorganic filler is too small or too large, the dispersibility during preparation of the material may worsen. Here, "average particle diameter" refers to the particle diameter determined by dispersion of the filler, together with a suitable dispersant, in an aqueous solution, and measurement with a particle size analyzer.

The amount of granular inorganic filler included, although not particularly limited, is set to preferably at least 5 parts by weight, more preferably at least 10 parts by weight, and even more preferably at least 15 parts by weight, per 100 parts by weight of the resin component of the cover-forming material. The upper limit is set to generally not more than 40 parts by weight, preferably not more than 30 parts by weight, and even more preferably not more than 25 parts by weight. If the amount of granular inorganic filler included is too small, a sufficient reinforcing effect may not be attainable. On the other hand, if the amount of granular inorganic filler included is too large, this may have an adverse influence on the dispersibility and resilience.

The specific gravity of the granular inorganic filler, although not particularly limited, is set to preferably not more than 4.8. The lower limit may be set to preferably at least 3.0. If the specific gravity of the granular inorganic filler is too large, the cover-forming material may become very heavy, as a result of which the weight of the overall ball may end up exceeding the regulation weight.

Various additives may be optionally included in this cover-forming material. For example, pigments, dispersants, antioxidants, light stabilizers, ultraviolet absorbers and internal mold lubricants may be suitably included.

The specific gravity of the cover-forming material, although not particularly limited, is set to preferably at least 0.97, more preferably from 1.00 to 1.50, and even more preferably from 1.03 to 1.20. If the specific gravity of the cover-forming material is too small, the reinforcing effect may be inadequate, as a result of which the durability of the ball to repeated impact may worsen. On the other hand, if the specific gravity of the cover-forming material is too large, the rebound may decrease, as a result of which a good distance may not be achieved.

The method of molding the cover may entail, for example, feeding the cover-forming material to an injection molding machine, and injecting the molten material over the intermediate layer that has been formed as described above. In this case, although the molding temperature varies depending on the type of resin and the compounding ratio of ingredients therein, it can generally be set within the range of 150 to 250° C.

The cover has a material hardness, expressed in terms of the Shore D hardness, which, although not particularly limited, may be set to preferably more than 50, more preferably at least 55, and even more preferably at least 58. The cover material hardness, expressed in terms of the Shore D hardness, may be set to preferably not more than 65, and more preferably not more than 62. If the material hardness of the cover is too low, the spin receptivity of the ball may be too high, resulting in a poor rebound and a drop in distance, or the scuff resistance may worsen. On the other hand, if the material hardness of the cover is too high, the durability of the ball to cracking under repeated impact may worsen, or the feel of the ball in the short game and on shots with a putter may worsen.

The cover thickness, although not particularly limited, is set to preferably at least 0.5 mm, more preferably at least 0.7 mm, and even more preferably at least 1.0 mm. The upper limit is set to preferably not more than 2.0 mm, more preferably not more than 1.5 mm, and even more preferably not more than 1.4 mm. If the cover is too thin, the durability of the ball to cracking on repeated impact may worsen. On the other hand, if the cover is too thick, the spin rate of the ball on shots with a driver (W#1) may become too high, resulting in a poor distance, or the feel of the ball in the short game and on shots with a putter may become too hard.

The cover is not limited to a single-layer structure; where necessary, the cover may be constructed of two or more layers composed of like or unlike materials. In such a case, at least one layer should serve as the cover formed of the above resin blend. Moreover, it is recommended that the hardness and thickness of the overall cover be adjusted within the above-indicated ranges.

In the golf ball of the invention, the hardnesses, thicknesses, initial velocities and specific gravities of the core, envelope layer, intermediate layer and ball satisfy the subsequently described relationships. The hardness, thickness, initial velocity and specific gravity relationships of the respective layers are described below.

In this invention, it is critical for the core, envelope layer, intermediate layer and cover to have surface hardnesses which satisfy the relationship:

$$\text{core surface hardness} > \text{envelope layer surface hardness} < \text{intermediate layer surface hardness} < \text{cover surface hardness}.$$

If the surface hardnesses of the respective layers do not satisfy this relationship, a good flight cannot be achieved on shots by both mid head-speed and low head-speed golfers and a feel at impact that is both soft and solid cannot be obtained.

It is also critical in this invention for the surface hardness of the intermediate layer and the surface hardness of the cover, expressed in terms of Shore D hardness, to satisfy the relationship:

$$5 \leq (\text{cover surface hardness} - \text{intermediate layer surface hardness}) \leq 15.$$

The lower limit of this value is preferably at least 7, and more preferably at least 9. The upper limit of this value is preferably not more than 13, and more preferably not more than 11. If this value is too small, the spin rate of the ball on full shots becomes too high, resulting in a poor distance, and a soft feel is not obtained. On the other hand, if this value is too large, the spin rate on full shots becomes too high, resulting in a poor distance, and the durability to cracking under repeated impact worsens.

The surface hardness of the envelope layer and the surface hardness of the intermediate layer, expressed in terms of Shore D hardness, although not particularly limited, preferably satisfy the relationship:

$$10 \leq (\text{intermediate layer surface hardness} - \text{envelope layer surface hardness}) \leq 50.$$

The lower limit of this value is more preferably at least 15, and even more preferably at least 20. The upper limit of this value is more preferably not more than 40, and even more preferably not more than 30. If the above value is too small, it may not be possible to obtain a feel at impact that is both soft and solid. On the other hand, if the above value is too large, a good distance may not be obtained and the durability to cracking on repeated impact may worsen.

It is critical for the surface hardness of the core and the surface hardness of the envelope layer, expressed in terms of Shore D hardness, to satisfy the relationship:

$$-40 \leq (\text{envelope layer surface hardness} - \text{core surface hardness}) \leq -5.$$

This value has a lower limit of preferably at least −30, and more preferably at least −20, and has an upper limit of preferably not more than −8, and more preferably not more than −10. If the above value is too small, a feel at impact that is both soft and solid cannot be obtained, or a good flight performance is not obtained when the ball is struck at a low head speed. On the other hand, if the above value is too large, the spin rate on full shots becomes too high, as a result of which a good distance is not achieved.

It is critical for the initial velocity (m/s) of the sphere obtained by covering the periphery of the core with the envelope layer and the intermediate layer (intermediate layer-encased sphere) and the initial velocity (m/s) of the ball to satisfy the relationship:

−1.0 m/s≤(ball initial velocity−intermediate layer-encased sphere initial velocity)≤0 m/s.

This value has a lower limit of preferably at least −0.8 m/s, and more preferably at least −0.4 m/s, and has an upper limit of preferably not more than −0.1 m/s, and more preferably not more than −0.2 m/s. If this value is too small, the cover becomes softer, as a result of which the spin rate on full shots rises, making it impossible to achieve a good distance, and a solid feel is not obtained. On the other hand, if this value is too large, the spin rate-lowering effect on full shots is inadequate, as a result of which a good distance is not obtained, and the cover becomes too hard, resulting in a poor durability to cracking on repeated impact.

It is critical for the initial velocity (m/s) of the sphere obtained by covering the periphery of the core with the envelope layer (envelope layer-encased sphere) and the initial velocity (m/s) of the intermediate layer-encased sphere to satisfy the relationship:

−0.2 m/s≤(intermediate layer-encased sphere initial velocity−envelope layer-encased sphere initial velocity).

This value has a lower limit of preferably at least −0.1 m/s, and more preferably at least 0 m/s. If this value is too small, the spin rate-lowering effect on full shots is inadequate, as a result of which a good distance may not be obtained.

The initial velocity (m/s) of the core and the initial velocity (m/s) of the ball, although not particularly limited, preferably satisfy the relationship:

−1.0 m/s≤(ball initial velocity−core initial velocity) ≤0 m/s.

This value has a lower limit of preferably at least −0.8 m/s, and more preferably at least −0.6 m/s, and has an upper limit of preferably not more than −0.1 m/s, and more preferably not more than −0.2 m/s. If this value is too small, the rebound of the ball as a whole may become low and the spin rate on full shots may increase excessively, as a result of which a good distance may not be achieved. On the other hand, if this value is too large, the cover may become hard and the durability to cracking under repeated impact may worsen.

The initial velocity (m/s) of the envelope layer-encased sphere and the initial velocity (m/s) of the ball, although not particularly limited, preferably satisfy the relationship:

−0.4≤(ball initial velocity−envelope layer-encased sphere initial velocity)≤0.4.

This value has a lower limit of more preferably at least −0.3 m/s, and even more preferably at least −0.2 m/s, and has an upper limit of more preferably not more than 0.2 m/s, and even more preferably not more than 0 m/s. If this value is too small, the spin rate on full shots may rise excessively, as a result of which a good distance may not be achieved. On the other hand, if this value is too large, the feel at impact may become too hard or the durability of the ball on repeated impact may worsen.

The initial velocity (m/s) of the core and the initial velocity (m/s) of the envelope-encased sphere, although not subject to any particular limitation, preferably satisfy the relationship:

−1≤(envelope layer-encased sphere initial velocity−core initial velocity)≤0.

This value has a lower limit of preferably at least −0.8 m/s, and more preferably at least −0.6 m/s, and has an upper limit of preferably not more than −0.1 m/s, and more preferably not more than −0.3 m/s. If this value is too small, the rebound of the ball may become too low and the spin rate on full shots may increase excessively, as a result of which a good distance may not be achieved. On the other hand, if this value is too large, it may not be possible to obtain a feel at impact that is both soft and solid.

As used herein, "initial velocity" refers to the initial velocity measured using an initial velocity measuring apparatus of the same type as a United States Golf Association (USGA) drum rotation type initial velocity instrument, and by the method of measurement set forth in the initial velocity rule for golf balls established by the USGA.

The specific gravity of the intermediate layer and the specific gravity of the cover, although not subject to any particular limitation, preferably satisfy the relationship:

cover specific gravity≥intermediate layer specific gravity.

These specific gravities more preferably satisfy the relationship:

cover specific gravity>intermediate layer specific gravity;

and it is recommended that they satisfy the relationship 0.05≤(cover specific gravity−intermediate layer specific gravity).

When the relationship between the specific gravity of the intermediate layer and the specific gravity of the cover departs from the above relationship, the durability to cracking under repeated impact may worsen and the resilience may decrease, as a result of which a good distance may not be achieved.

The specific gravities of the core and the envelope layer, although not subject to any particular limitation, may both be set to preferably at least 1.00, more preferably at least 1.02, and even more preferably at least 1.04. The upper limit may be set to preferably not more than 1.40, more preferably not more than 1.30, and even more preferably not more than 1.20. At core, envelope layer and cover specific gravities outside of the above ranges, the desired distance, feel at impact and durability to cracking with repeated impact may not all be achievable.

The specific gravity of the intermediate layer, although not subject to any particular limitation, may be set to preferably at least 0.9, more preferably at least 0.92, and even more preferably at least 0.95. The upper limit may be set to preferably not more than 1.2, more preferably not more than 1.1, and even more preferably not more than 1.0.

If the specific gravity of the intermediate layer falls outside of the above range, the rebound may decrease, as a result of which a good distance may not be achieved, and the durability to cracking on repeated impact may worsen.

The envelope layer thickness, the intermediate layer thickness and the cover thickness are not subject to any particular limitation, although they preferably satisfy the relationships:

envelope layer thickness≤cover thickness, and intermediate layer thickness≤cover thickness.

In cases where the envelope layer thickness, intermediate layer thickness and cover thickness do not satisfy the above relationships, the spin rate on full shots may rise excessively, as a result of which a good distance may not be achieved.

Furthermore, in this invention, it is critical that the ball satisfy the relationship:

0.86≤A/B≤0.98, where A is the deflection (mm) of the ball when compressed under a final load of 1,275 N (130 kgf) from an initial load of 98 N (10 kgf) and B is the deflection (mm) of the intermediate layer-encased sphere when compressed under a final load of 1,275 N (130 kgf) from an initial load of 98 N (10 kgf). This value has a lower limit of preferably at least 0.87, and more preferably at least 0.88, and has an upper limit of preferably not more than 0.95, and more preferably not more than 0.93. If this value is too small, the feel at impact becomes too hard and the durability to cracking under repeated impact becomes poor. On the other hand, if this value is too large, the feel at impact becomes too soft and a good distance may not be achieved.

The deflection (mm) of the core and the deflection (mm) of the ball are not subject to any particular limitation, although they preferably satisfy the relationship:

−0.2 mm≤(core deflection−ball deflection)≤1.2 mm.

The lower limit of this value is more preferably at least 0.4 mm, and even more preferably at least 0.6 mm. The upper limit is more preferably not more than 1.0 mm, and even more preferably not more than 0.8 mm. If this value is too small, the rebound may be low or the spin rate may rise, as a result of which a good distance may not be achieved. On the other hand, if this value is too large, the durability to cracking under repeated impact may worsen or the feel at impact on shots with a W#1 may be too soft.

The deflection (mm) of the core and the deflection (mm) of the envelope layer-encased sphere are not subject to any particular limitation, although they preferably satisfy the relationship:

−0.6 mm≤(core deflection−envelope layer-encased sphere deflection)≤0.5 mm.

The lower limit of this value is more preferably at least −0.4 mm, and even more preferably at least −0.2 mm. The upper limit is more preferably not more than 0.4 mm, and even more preferably not more than 0.2 mm. If this value is too small, it may not be possible to achieve a feel at impact that is both soft and solid. On the other hand, if this value is too large, the durability to cracking under repeated impact may worsen and it may not be possible to achieve a feel at impact that is both soft and solid.

In the golf ball of the invention, as with ordinary golf balls, it is desirable to form numerous dimples on the surface of the cover in order to further improve the aerodynamic properties and increase the distance traveled by the ball. By optimizing the number of dimple types and the total number of dimples, owing to synergistic effects with the above-described ball construction, a golf ball having a more stable trajectory and an excellent distance performance can be obtained.

The number of dimples, although not subject to any particular limitation, may be set to preferably at least 280, more preferably at least 300, and even more preferably at least 320. The maximum number of dimples may be set to preferably not more than 360, more preferably not more than 350, and even more preferably not more than 340. If the number of dimples is larger than the above range, the trajectory of the ball may become low, as a result of which a good distance may not be achieved. On the other hand, if the number of dimples is smaller than the above range, the trajectory may become high, as a result of which an increased distance may not be achieved.

The dimple shapes that are used may be of one type or a combination of two or more types selected from among not only circular shapes, but also various polygonal shapes as well as dewdrop shapes and oval shapes.

The dimple diameter is not particularly limited. However, in cases where circular dimples are used, the diameter is preferably set to from about 2.5 mm to about 6.5 mm. Similarly, the dimple depth, although not subject to any particular limitation, is preferably set in the range of from 0.08 to 0.30 mm.

If the foregoing dimple parameters such as the number and shape of the dimples do not satisfy the above conditions, a trajectory that fails to provide a good distance may arise, as a result of which a satisfactory distance may not be achieved.

Also, in this invention, the cover of the golf ball may be subjected to various types of treatment, such as surface preparation, stamping and painting, in order to enhance the design and durability of the ball.

The golf ball of the invention can be manufactured in conformity with the Rules of Golf for competitive play, and may be formed to a diameter of not less than 42.67 mm. The weight may be set to generally not less than 45.0 g, and preferably not less than 45.2 g. The upper limit is preferably set to not more than 45.93 g.

EXAMPLES

The following Examples and Comparative Examples are provided to illustrate the invention, and are not intended to limit the scope thereof.

Examples 1 to 4, Comparative Examples 1 to 8

Formation of the Core

In each example, a solid core was produced by preparing the rubber composition shown in Table 1, then molding and vulcanizing under vulcanization conditions of 155° C. and 15 minutes.

TABLE 1

| Core formulation | Example | | | | Comparative Example | | | | | | | |
|---|---|---|---|---|---|---|---|---|---|---|---|---|
| (pbw) | 1 | 2 | 3 | 4 | 1 | 2 | 3 | 4 | 5 | 6 | 7 | 8 |
| Polybutadiene A | 100 | 100 | 100 | 100 | 80 | 100 | 80 | 90 | 80 | 80 | 80 | 100 |
| Polybutadiene B | — | — | — | — | 20 | — | 20 | — | 20 | 5 | 20 | — |
| Polyisoprene rubber | — | — | — | — | — | — | — | 10 | — | 15 | — | — |
| Zinc acrylate | 23.5 | 22.1 | 23.5 | 22.1 | 24.0 | 27.0 | 23.0 | 22.5 | 24.0 | 24.0 | 24.0 | 23.5 |
| Organic Peroxide (1) | 0.6 | 0.6 | 0.6 | 0.6 | 0.6 | 0.6 | 0.6 | 0.6 | 0.6 | 0.6 | 0.6 | 0.6 |
| Organic Peroxide (2) | 0.6 | 0.6 | 0.6 | 0.6 | 0.6 | 0.6 | 0.6 | 0.6 | 0.6 | 0.6 | 0.6 | 0.6 |
| Antioxidant | 0.1 | 0.1 | 0.1 | 0.1 | 0.1 | — | 0.1 | 0.1 | 0.1 | 0.1 | 0.1 | 0.1 |
| Barium sulfate | 23.6 | 24.2 | 23.6 | 24.2 | 21.2 | — | 27.2 | 18.2 | 23.5 | 23.5 | 23.5 | 23.6 |
| Zinc oxide | 4.0 | 4.0 | 8.8 | 8.8 | 4.0 | 24.0 | 4.0 | 4.0 | 4.0 | 4.0 | 4.0 | 8.8 |
| Zinc salt of pentachlorothiophenol | 0.6 | 0.6 | 0.6 | 0.6 | 0.1 | 0.7 | — | — | 0.1 | 0.1 | 0.1 | 0.6 |

The ingredients in Table 1 are described below.
Polybutadiene A: Available under the trade name "BR01" from JSR Corporation.
Polybutadiene B: Available under the trade name "BR51" from JSR Corporation
Polyisoprene rubber: Available under the trade name "IR2200" from JSR Corporation.
Organic Peroxide (1): Dicumyl peroxide; available under the trade name "Percumyl D" from NOF Corporation.
Organic Peroxide (2): A mixture of 1,1-di(t-butylperoxy)-cyclohexane and silica, available under the trade name "Perhexa C-40" from NOF Corporation.
Antioxidant: 2,2'-Methylenebis(4-methyl-6-t-butyl-phenol), available under the trade name "Nocrac NS-6" from Ouchi Shinko Chemical Industry Co., Ltd.
Barium sulfate: Barite powder, available under the trade name "Barico #300" from Hakusui Tech Co., Ltd.

Formation of Envelope Layer, Intermediate Layer and Cover

An envelope layer-forming material formulated as shown in Table 2 was injection-molded over the core obtained as described above to form an envelope layer, thereby giving an envelope layer-encased sphere. Next, an intermediate layer-forming material formulated as shown in Table 2 was injection-molded over the envelope layer-encased sphere to form an intermediate layer, thereby giving an intermediate layer-encased sphere. A cover-forming material formulated as shown in Table 2 was then injection-molded over the intermediate layer-encased sphere to form a cover, thereby giving a golf ball having a core encased by an envelope layer, an intermediate layer and a cover. At this time, the dimples shown in FIG. 2 were formed on the surface of the cover. Details on these dimples are shown in Table 3. The golf balls obtained in Comparative Examples 2 and 3 were three-piece solid golf balls having no intermediate layer. The golf ball obtained in Comparative Example 4 was a two-piece solid golf ball having no envelope layer and intermediate layer.

TABLE 2

| Type of material (pbw) | I | II | III | IV | V | VI | VII | VIII | IX | X | XI | XII | XIII |
|---|---|---|---|---|---|---|---|---|---|---|---|---|---|
| Hytrel 3046 | 100 | | | | | | | | | | | | |
| Hytrel 4047 | | 100 | | | | | | | | | | | |
| HPF 1000 | | | 100 | | | | | | | | | | |
| AN 4319 | | | | 100 | 100 | | | | | | 20 | | 20 |
| Himilan 1706 | | | | | | 50 | | | | | | | |
| Himilan 1557 | | | | | | | | 50 | | | 20 | 50 | 20 |
| Himilan 1555 | | | | | | | | | | | | 50 | |
| Himilan 1855 | | | | | | | | | | 30 | | | 30 |
| Himilan 1605 | | | | | | | 50 | 50 | 50 | | | | |
| Surlyn 8120 | | | | | | | | | | 30 | | | 30 |
| AM 7329 | | | | | | | 50 | | | | | | |
| AM 7327 | | | | | | | | | 100 | | | | |
| AM 7317 | | | | | | | | | | 50 | | | |
| AM 7318 | | | | | | | | | | 50 | | | |
| Polyethylene wax | | | | | | 1 | 2 | | 1 | 1 | | 1 | 1 |
| Precipitated barium sulfate | | | | | | | 20 | | 20 | 20 | | 20 | 20 |
| Magnesium stearate | | | 70 | | 70 | 1 | 0.4 | 1.3 | 1 | 1 | | 1 | 1 |
| Magnesium oxide | | | 1.9 | | 1.9 | | | | | | | | |
| Titanium oxide | | | 1.5 | | 0 | | | 4.8 | 2.8 | | | | |

The materials in Table 2 are described below.
Hytrel: Thermoplastic polyether ester elastomers available from DuPont-Toray Co., Ltd.
AN 4319: Available under the trade name Nucrel from DuPont-Mitsui Polychemicals Co., Ltd.
HPF 1000: Available from E.I. DuPont de Nemours & Co.; a terpolymer composed of about 75 to 76 wt % ethylene, about 8.5 wt % acrylic acid and about 15.5 to 16.5 wt % n-butyl acrylate, in which all (100%) of the acid groups are neutralized with magnesium ions.
Himilan: Ionomer resins available from DuPont-Mitsui Polychemicals Co., Ltd.
Surlyn: An ionomer resin available from E.I. DuPont de Nemours & Co.

AM 7329, AM 7327, AM 7317, AM 7318:
  Ionomer resins available from DuPont-Mitsui Polychemicals Co., Ltd.
Polyethylene wax: Available under the trade name "Sanwax 161P" from Sanyo Chemical Industries, Ltd.
Precipitated barium sulfate:
  Available as "Precipitated Barium Sulfate, Grade #300" from Sakai Chemical Industry Co., Ltd.
Magnesium stearate: Available from Sakai Chemical Industry Co., Ltd.

TABLE 3

| No. | Number of dimples | Diameter (mm) | Depth (mm) | $V_0$ | SR (%) | VR (%) |
|---|---|---|---|---|---|---|
| 1 | 12 | 4.6 | 0.15 | 0.47 | 0.81 | 0.783 |
| 2 | 234 | 4.4 | 0.15 | 0.47 | | |
| 3 | 60 | 3.8 | 0.14 | 0.47 | | |
| 4 | 6 | 3.5 | 0.13 | 0.46 | | |
| 5 | 6 | 3.4 | 0.13 | 0.46 | | |
| 6 | 12 | 2.6 | 0.10 | 0.46 | | |
| Total | 330 | | | | | |

Dimple Definitions

Diameter: Diameter of flat plane circumscribed by edge of dimple.

Depth: Maximum depth of dimple from flat plane circumscribed by edge of dimple.

$V_0$: Spatial volume of dimple below flat plane circumscribed by dimple edge, divided by volume of cylinder whose base is the flat plane and whose height is the maximum depth of dimple from the base.

SR: Sum of individual dimple surface areas, each defined by the flat plane circumscribed by the edge of a dimple, as a percentage of the surface area of a hypothetical sphere were the ball to have no dimples on the surface thereof.

VR: Sum of spatial volumes of individual dimples formed below flat plane circumscribed by the edge of a dimple, as a percentage of the volume of a hypothetical sphere were the ball to have no dimples on the surface thereof.

The following measurements and evaluations were carried out on the golf balls thus obtained. The results are presented in Tables 4 to 6.

Diameters of Core, Envelope Layer-Encased Sphere and Intermediate Layer-Encased Sphere The diameter at five random places on the surface of a single core, a single envelope layer-encased sphere or a single intermediate layer-encased sphere was measured at a temperature of 23.9±1° C., and the average of the five measurements was determined. Next, the average measured values thus obtained for five individual cores, five individual envelope layer-encased spheres and five individual intermediate layer-encased spheres were used to determine the average diameters of the cores, the envelope layer-encased spheres and the intermediate layer-encased spheres.

Ball Diameter

The diameters at five random dimple-free places (lands) on the surface of a ball were measured at a temperature of 23.9±1° C. and, using the average of these measurements as the measured value for a single ball, the average diameter for five measured balls was determined.

Deflections of Core, Envelope Layer-Encased Sphere, Intermediate Layer-Encased Sphere and Ball The core, envelope layer-encased sphere, intermediate layer-encased sphere or ball was placed on a hard plate, and the deflection when compressed under a final load of 1,275 N (130 kgf) from an initial load of 98 N (10 kgf) was measured for each. The deflection here refers in each case to the measured value obtained after holding the test specimen isothermally at 23.9° C.

Center Hardness of (Shore D and JIS-C) of Core

The hardness at the center of the cross-section obtained by cutting the core in half through the center was measured. The Shore D hardness was measured using a type D durometer in accordance with ASTM D2240-95, and the JIS-C hardness was measured using the spring-type (JIS-C type) durometer specified in JIS K 6301-1975.

Surface Hardness (Shore D and JIS-C) of Core

Measurements were taken by pressing the durometer indenter perpendicularly against the surface of the spherical core. The Shore D hardness was measured using a type D durometer in accordance with ASTM D2240-95, and the JIS-C hardness was measured using the spring-type (JIS-C type) durometer specified in JIS K 6301-1975.

Surface Hardnesses (Shore D) of Envelope Layer-Encased Sphere, Intermediate Layer-Encased Sphere and Ball (Cover)

Measurements were taken by pressing the durometer indenter perpendicularly against the surface of the envelope-encased sphere, the intermediate layer-encased sphere or the ball (cover). The surface hardness of the ball (cover) is the measured value obtained at dimple-free (land) areas on the ball surface. The Shore D hardnesses were measured using a type D durometer in accordance with ASTM D2240-95.

Material Hardnesses (Shore D) of Envelope Layer, Intermediate Layer and Cover

The resin materials for, respectively, the envelope layer, the intermediate layer and the cover were formed into sheets having a thickness of 2 mm and left to stand for at least two weeks, following which the Shore D hardnesses were measured in accordance with ASTM D2240-95.

Initial Velocities

The initial velocities were measured using an initial velocity measuring apparatus of the same type as the USGA drum rotation-type initial velocity instrument approved by the R&A. The core, envelope layer-encased sphere, intermediate layer-encased sphere and ball (collectively referred to below as "spherical test specimens") were held isothermally in a 23.9±1° C. environment for at least 3 hours, then tested in a chamber at a room temperature of 23.9±2° C. Each spherical test specimen was hit using a 250-pound (113.4 kg) head (striking mass) at an impact velocity of 143.8 ft/s (43.83 m/s). One dozen spherical test specimens were each hit four times. The time taken for the test specimen to traverse a distance of 6.28 ft (1.91 m) was measured and used to compute the initial velocity (m/s). This cycle was carried out over a period of about 15 minutes.

Flight Performance

A driver (W#1) was mounted on a golf swing robot, and the distances traveled by balls when hit at head speeds (HS) of 40 m/s and 30 m/s were measured. The club used was a TourStage PHYZ driver (2011 model; loft angle, 11.5°) manufactured by Bridgestone Sports Co., Ltd. The flight performance was rated according to the following criteria.
  HS 40 m/s
  Good: Total distance was 199 m or more
  NG: Total distance was 198 m or less
  HS 30 m/s
  Good: Total distance was 136 m or more
  NG: Total distance was 135 m or less Feel Using a driver (W#1), sensory evaluations were carried out under the following criteria by amateur golfers having head speeds of 30 to 40 m/s Good: Feel at impact was good, combining both a soft and solid feel NG: Either the soft feel or the solid feel was inadequate Durability to Repeated Impact The durability of the golf ball was evaluated using an ADC Ball COR Durability Tester produced by Automated Design Corporation (U.S.). This tester fires a golf ball pneumatically and causes it to repeatedly strike two metal plates arranged in parallel. The incident velocity against the metal plates was set at 43 m/s. For the ball in each example, a loss of durability was determined to have occurred when the initial velocity of the ball fell to or below 97% of the average initial velocity for the first ten shots.

Based on the number of shots taken when a loss of durability occurred, the durability indexes for the balls in the respective examples were calculated relative to an arbitrary index of 100 for the number of shots taken with the ball in Example 2. The durability to cracking was rated as shown in Table 6 according to the criteria shown below. The average value for N=3 golf balls was used as the basis for evaluation in each example.

Good: Durability index was 95 or more

Fair: Durability index was at least 90 but less than 95

NG: Durability index was less than 90

TABLE 4

|  |  | Example | | | | Comparative Example | |
|---|---|---|---|---|---|---|---|
|  |  | 1 | 2 | 3 | 4 | 1 | 2 |
| Core | Structure | 4 layers | 4 layers | 4 layers | 4 layers | 4 layers | 3 layers |
|  | Diameter (mm) | 35.2 | 35.2 | 35.2 | 35.2 | 35.2 | 35.2 |
|  | Weight (g) | 27.8 | 27.8 | 27.8 | 27.8 | 26.9 | 27.2 |
|  | Specific gravity | 1.21 | 1.21 | 1.21 | 1.21 | 1.18 | 1.19 |
|  | Deflection (mm) | 4.5 | 4.6 | 4.5 | 4.6 | 4.1 | 3.8 |
|  | Initial velocity (m/s) | 78.1 | 78.1 | 78.1 | 78.1 | 77.9 | 78.1 |
|  | Surface hardness (Cs), JIS-C | 73 | 72 | 73 | 72 | 75 | 77 |
|  | Center hardness (Cc), JIS-C | 57 | 56 | 57 | 56 | 59 | 61 |
|  | Surface hardness − Center hardness (Cs − Cc), JIS-C | 15 | 15 | 15 | 15 | 16 | 16 |
|  | Surface hardness (Ds), Shore D | 47 | 47 | 47 | 47 | 49 | 51 |
| Envelope layer | Material (type) | I | I | I | I | II | I |
|  | Thickness (mm) | 1.21 | 1.22 | 1.21 | 1.22 | 1.20 | 1.68 |
|  | Specific gravity | 1.09 | 1.09 | 1.09 | 1.09 | 1.12 | 1.07 |
|  | Weight (g) | 5.5 | 5.5 | 5.5 | 5.5 | 5.6 | 7.7 |
|  | Material hardness (Shore D) | 27 | 27 | 27 | 27 | 40 | 27 |
| Envelope layer-encased sphere | Diameter (mm) | 37.7 | 37.6 | 37.7 | 37.6 | 37.6 | 38.6 |
|  | Weight (g) | 33.3 | 33.3 | 33.3 | 33.3 | 32.5 | 34.9 |
|  | Deflection (mm) | 4.4 | 4.7 | 4.4 | 4.7 | 3.9 | 3.7 |
|  | Initial velocity (m/s) | 77.6 | 77.7 | 77.6 | 77.7 | 77.3 | 77.2 |
|  | Surface hardness (Es), Shore D | 33 | 33 | 33 | 33 | 46 | 33 |
|  | Envelope layer surface hardness (Es) − Core surface hardness (Ds), Shore D | −14 | −14 | −14 | −14 | −3 | −18 |
|  | Envelope layer-encased sphere initial velocity − Core initial velocity (m/s) | −0.5 | −0.4 | −0.5 | −0.4 | −0.6 | −0.9 |
|  | Core deflection − Envelope layer-encased sphere deflection (mm) | 0.1 | 0 | 0.1 | 0 | 0.2 | 0 |
| Intermediate layer | Material (type) | IV | IV | V | V | V | — |
|  | Thickness (mm) | 1.22 | 1.21 | 1.15 | 1.17 | 1.20 | — |
|  | Specific gravity | 0.94 | 0.93 | 0.92 | 0.92 | 0.97 | — |
|  | Material hardness (Shore D) | 50 | 50 | 51 | 51 | 49 | — |
| Intermediate layer-encased sphere | Diameter (mm) | 40.1 | 40.1 | 39.9 | 40.0 | 40.0 | — |
|  | Weight (g) | 38.8 | 38.6 | 38.3 | 38.4 | 38.0 | — |
|  | Deflection (mm) | 4.1 | 4.4 | 4.1 | 4.3 | 3.7 | — |
|  | Initial velocity (m/s) | 77.8 | 77.8 | 77.8 | 77.8 | 77.3 | — |
|  | Surface hardness (Ms), Shore D | 56 | 56 | 57 | 57 | 55 | — |
|  | Intermediate layer surface hardness (Ms) − Envelope layer surface hardness (Es), Shore D | 23 | 23 | 24 | 24 | 9 | — |
|  | Intermediate layer-encased sphere initial velocity − Envelope layer-encased sphere initial velocity (m/s) | 0.2 | 0.1 | 0.1 | 0.2 | 0 | — |
| Cover | Material (type) | XII | XII | XII | XII | VI | VII |
|  | Thickness (mm) | 1.29 | 1.30 | 1.36 | 1.35 | 1.35 | 2.06 |
|  | Specific gravity | 1.01 | 1.01 | 1.02 | 1.01 | 1.05 | 0.97 |
|  | Material hardness (Shore D) | 60 | 60 | 60 | 60 | 63 | 63 |
| Ball | Diameter (mm) | 42.67 | 42.66 | 42.67 | 42.67 | 42.70 | 42.70 |
|  | Weight (g) | 45.6 | 45.5 | 45.6 | 45.5 | 45.4 | 45.3 |
|  | Deflection (mm) | 3.7 | 4.0 | 3.7 | 3.9 | 3.0 | 3.1 |
|  | Initial velocity (m/s) | 77.6 | 77.6 | 77.5 | 77.5 | 77.3 | 77.2 |
|  | Surface hardness (Bs), Shore D | 66 | 66 | 66 | 66 | 69 | 69 |
|  | Ball deflection/Intermediate layer-encased sphere deflection (mm) | 0.90 | 0.90 | 0.90 | 0.90 | 0.81 | 0.83 |
|  | Core deflection − Ball deflection (mm) | 0.74 | 0.64 | 0.77 | 0.77 | 1.10 | 0.67 |
|  | Cover specific gravity − Intermediate layer specific gravity | 0.07 | 0.08 | 0.09 | 0.09 | 0.08 | — |
|  | Ball surface hardness (Bs) − Intermediate layer surface hardness (Es), Shore D | 10 | 10 | 9 | 9 | 14 | — |
|  | Ball initial velocity − Core initial velocity (m/s) | −0.5 | −0.5 | −0.6 | −0.6 | −0.6 | −0.8 |

TABLE 4-continued

|  | Example | | | | Comparative Example | |
|---|---|---|---|---|---|---|
|  | 1 | 2 | 3 | 4 | 1 | 2 |
| Ball initial velocity − Envelope layer-encased sphere initial velocity (m/s) | 0.0 | −0.1 | −0.1 | −0.2 | 0.0 | 0.0 |
| Ball initial velocity − Intermediate layer-encased sphere initial velocity (m/s) | −0.2 | −0.2 | −0.2 | −0.3 | 0.0 | — |

TABLE 5

|  |  | Comparative Example | | | | | |
|---|---|---|---|---|---|---|---|
|  |  | 3 | 4 | 5 | 6 | 7 | 8 |
| Structure |  | 3 layers | 2 layers | 4 layers | 4 layers | 4 layers | 4 layers |
| Core | Diameter (mm) | 37.3 | 39.3 | 35.2 | 35.2 | 35.2 | 35.2 |
|  | Weight (g) | 32.7 | 36.8 | 27.2 | 27.2 | 27.2 | 27.8 |
|  | Specific gravity | 1.2 | 1.16 | 1.19 | 1.19 | 1.19 | 1.21 |
|  | Deflection (mm) | 4.1 | 4.0 | 4.0 | 4.5 | 4.0 | 4.5 |
|  | Initial velocity (m/s) | 77.35 | 76.8 | 77.7 | 76.9 | 77.7 | 78.1 |
|  | Surface hardness (Cs), JIS-C | 75 | 76 | 76 | 73 | 76 | 73 |
|  | Center hardness (Cc), JIS-C | 59 | 60 | 60 | 57 | 60 | 57 |
|  | Surface hardness − Center hardness (Cs − Cc), JIS-C | 16 | 16 | 16 | 15 | 16 | 15 |
|  | Surface hardness (Ds), Shore D | 49 | 49 | 49 | 47 | 49 | 47 |
| Envelope layer | Material (type) | III | — | I | I | I | I |
|  | Thickness (mm) | 1.35 | — | 1.20 | 1.20 | 1.20 | 1.21 |
|  | Specific gravity | 0.98 | — | 1.07 | 1.07 | 1.07 | 1.09 |
|  | Weight (g) | 6.2 | — | 5.4 | 5.4 | 5.4 | 5.5 |
|  | Material hardness (Shore D) | 49 | — | 27 | 27 | 27 | 27 |
| Envelope layer-encased sphere | Diameter (mm) | 40.0 | — | 37.6 | 37.6 | 37.6 | 37.7 |
|  | Weight (g) | 38.9 | — | 32.6 | 32.6 | 32.6 | 33.3 |
|  | Deflection (mm) | 3.9 | — | 3.9 | 4.3 | 3.9 | 4.4 |
|  | Initial velocity (m/s) | 77.1 | — | 76.9 | 76.4 | 76.9 | 77.6 |
|  | Surface hardness (Es), Shore D | 55 | — | 33 | 33 | 33 | 33 |
| Envelope layer surface hardness (Es) − Core surface hardness (Ds), Shore D |  | 6 | — | −16 | −14 | −16 | −14 |
| Envelope layer-encased sphere initial velocity − Core initial velocity (m/s) |  | −0.3 | — | −0.8 | −0.5 | −0.8 | −0.5 |
| Core deflection − Envelope layer-encased sphere deflection (mm) |  | 0.3 | — | 0.1 | 0.2 | 0.1 | 0.1 |
| Intermediate layer | Material (type) | — | — | IV | IV | XI | V |
|  | Thickness (mm) | — | — | 1.27 | 1.27 | 1.27 | 1.15 |
|  | Specific gravity | — | — | 0.96 | 0.96 | 0.96 | 0.92 |
|  | Material hardness (Shore D) | — | — | 50 | 50 | 50 | 51 |
| Intermediate layer-encased sphere | Diameter (mm) | — | — | 40.1 | 40.1 | 40.1 | 39.9 |
|  | Weight (g) | — | — | 38.4 | 38.4 | 38.4 | 38.3 |
|  | Deflection (mm) | — | — | 3.7 | 4.1 | 3.7 | 4.1 |
|  | Initial velocity (m/s) | — | — | 77.2 | 76.8 | 76.6 | 77.8 |
|  | Surface hardness (Ms), Shore D | — | — | 56 | 56 | 56 | 57 |
| Intermediate layer surface hardness (Ms) − Envelope layer surface hardness (Es), Shore D |  | — | — | 23 | 23 | 23 | 24 |
| Intermediate layer-encased sphere initial velocity − Envelope layer-encased sphere initial velocity (m/s) |  | — | — | 0.3 | 0.4 | −0.3 | 0.1 |
| Cover | Material (type) | VIII | VII | IX | X | VI | VIII |
|  | Thickness (mm) | 1.35 | 1.70 | 1.28 | 1.28 | 1.28 | 1.36 |
|  | Specific gravity | 0.92 | 0.97 | 1.05 | 1.05 | 1.05 | 1.01 |
|  | Material hardness (Shore D) | 61 | 63 | 48 | 66 | 63 | 52 |
| Ball | Diameter (mm) | 42.70 | 42.70 | 42.70 | 42.70 | 42.70 | 42.67 |
|  | Weight (g) | 45.4 | 45.3 | 45.4 | 45.4 | 45.4 | 45.5 |
|  | Deflection (mm) | 3.3 | 3.3 | 3.5 | 3.3 | 3.2 | 4.1 |
|  | Initial velocity (m/s) | 77.3 | 77.3 | 76.3 | 77.0 | 76.7 | 76.3 |
|  | Surface hardness (Bs), Shore D | 67 | 69 | 54 | 72 | 69 | 58 |
| Ball deflection/Intermediate layer-encased sphere deflection (mm) |  | 0.86 | — | 0.95 | 0.80 | 0.85 | 0.99 |
| Core deflection − Ball deflection (mm) |  | 0.80 | 0.70 | 0.50 | 1.15 | 0.85 | 0.42 |
| Cover specific gravity − Intermediate layer specific gravity |  | — | — | 0.09 | 0.09 | 0.09 | 0.09 |
| Ball surface hardness (Bs) − Intermediate layer surface hardness (Es), Shore D |  | — | — | −2 | 16 | 13 | 1 |
| Ball initial velocity − Core initial velocity (m/s) |  | 0.0 | 0.5 | −1.4 | 0.1 | −1.0 | −1.8 |
| Ball initial velocity − Envelope layer-encased sphere initial velocity (m/s) |  | 0.2 | — | −0.6 | 0.6 | −0.2 | −1.3 |

TABLE 5-continued

|  | Comparative Example | | | | | |
| --- | --- | --- | --- | --- | --- | --- |
|  | 3 | 4 | 5 | 6 | 7 | 8 |
| Ball initial velocity − Intermediate layer-encased sphere initial velocity (m/s) | — | — | −0.9 | 0.2 | 0.1 | −1.5 |

TABLE 6

|  |  |  | Example | | | | Comparative Example | | | | | | | |
| --- | --- | --- | --- | --- | --- | --- | --- | --- | --- | --- | --- | --- | --- | --- |
|  |  |  | 1 | 2 | 3 | 4 | 1 | 2 | 3 | 4 | 5 | 6 | 7 | 8 |
| Flight performance | W#1 HS, 40 m/s | Spin rate (rpm) | 2,738 | 2,730 | 2,759 | 2,783 | 2,821 | 2,953 | 2,846 | 2,783 | 2,989 | 2,668 | 2,875 | 2,933 |
|  |  | Total distance (m) | 201.9 | 202.2 | 202.9 | 202.7 | 201.1 | 197.9 | 200.1 | 199.6 | 194.9 | 200.7 | 197.2 | 195.2 |
|  |  | Rating | good | good | good | good | good | NG | good | good | NG | good | NG | NG |
|  | W#1 HS, 30 m/s | Spin rate (rpm) | 2,899 | 2,891 | 2,921 | 2,947 | 3,038 | 3,075 | 2,935 | 3,045 | 3,172 | 2,869 | 3,043 | 3,145 |
|  |  | Total distance (m) | 136.9 | 136.5 | 136.4 | 137.2 | 134.9 | 134.1 | 136 | 134.8 | 131.9 | 136.7 | 134 | 132.1 |
|  |  | Rating | good | good | good | good | NG | NG | good | NG | NG | good | NG | NG |
| Feel |  | Rating | good | good | good | good | good | good | NG | NG | NG | good | good | good |
| Durability to repeated impact |  | Rating | good | good | good | good | good | good | good | NG | good | NG | good | good |

In Comparative Example 1, the (envelope layer surface hardness−core surface hardness) value, expressed in terms of Shore D hardness, was larger than −5 and the (ball deflection/intermediate layer-encased sphere deflection) value was less than 0.86. As a result, the distance traveled by the ball on shots taken at a low head speed was poor.

The ball in Comparative Example 2 was a three-piece golf ball having no intermediate layer. As a result, the distances traveled by the ball on shots taken in the mid head-speed range and at a low head speed were poor.

The ball in Comparative Example 3 was a three-piece golf ball having no intermediate layer. As a result, the feel at impact was inferior to that of the balls in the working examples of the invention.

The ball in Comparative Example 4 was a two-piece golf ball having no intermediate layer and envelope layer. As a result, the flight performance and feel at impact on shots taken at a low head speed were poor, and the durability to repeated impact was poor.

The ball in Comparative Example 5 was a four-piece golf ball in which the ball surface hardness was lower than the intermediate layer surface hardness. As a result, the spin rate was high and the distance traveled by the ball was poor.

In Comparative Example 6, the (cover Shore D hardness−intermediate layer Shore D hardness) value was larger than 15 and the (ball deflection/intermediate layer-encased sphere deflection) value was less than 0.86. As a result, the durability to repeated impact was poor.

In Comparative Example 7, the (intermediate layer-encased sphere initial velocity−envelope layer-encased sphere initial velocity) value was lower than −0.2 m/s and the (ball deflection/intermediate layer-encased sphere deflection) value was lower than 0.86. As a result, the spin rate-lowering effect was inadequate and the distance traveled by the ball was poor.

In Comparative Example 8, the (ball initial velocity−intermediate layer-encased sphere initial velocity) value was lower than −1.0 m/s and the (ball deflection/intermediate layer-encased sphere deflection) value was greater than 0.98. As a result, the spin rate-lowering effect was inadequate, the rebound was low and the distance traveled by the ball was poor.

Japanese Patent Application No. 2014-140671 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A multi-piece solid golf ball comprising a core, an envelope layer, an intermediate layer and a cover, wherein the core, envelope layer, intermediate layer and cover have respective surface hardnesses which satisfy the relationship:

core surface hardness>envelope layer surface hardness<intermediate layer surface hardness<cover surface hardness;

the surface hardness of the core and the surface hardness of the envelope layer, expressed in terms of Shore D hardness, satisfy the relationship:

−14≤(envelope layer surface hardness−core surface hardness)≤−5;

the surface hardness of the intermediate layer and the surface hardness of the cover, expressed in terms of Shore D hardness, satisfy the relationship:

5≤(cover surface hardness−intermediate layer surface hardness)≤15;

the ball and a sphere composed of the core covered peripherally by the envelope layer and the intermediate layer (intermediate layer-encased sphere) have respective initial velocities (m/s) which satisfy the relationship:

−1.0 m/s≤(ball initial velocity−intermediate layer-encased sphere initial velocity)≤0 m/s;

the intermediate layer-encased sphere and a sphere composed of the core covered peripherally by the envelope layer (envelope layer-encased sphere) have respective initial velocities (m/s) which satisfy the relationship:

−0.2 m/s≤(intermediate layer-encased sphere initial velocity−envelope layer-encased sphere initial velocity); and the ball satisfies the relationship:

0.86≤A/B≤0.98, where A is the deflection (mm) of the ball when compressed under a final load of 1,275 N (130 kgf) from an initial load of 98 N (10 kgf) and B is the deflection (mm) of the intermediate layer-encased sphere when compressed under a final load of 1,275 N (130 kgf) from an initial load of 98 N (10 kgf), and wherein the surface hardness of the envelope layer and the surface hardness of the intermediate layer, expressed in terms of Shore D hardness, satisfy the relationship:

20≤(intermediate layer surface hardness−envelope layer surface hardness)≤30.

2. The multi-piece solid golf ball of claim 1, wherein the initial velocity (m/s) of the core and the initial velocity (m/s) of the ball satisfy the relationship:

−1.0 m/s≤(ball initial velocity−core initial velocity) ≤0 m/s.

3. The multi-piece solid golf ball of claim 1, wherein the initial velocity (m/s) of the envelope layer-encased sphere and the initial velocity (m/s) of the ball satisfy the relationship:

−0.4 m/s≤(ball initial velocity−envelope layer-encased sphere initial velocity)≤0.4 m/s, and the initial velocity (m/s) of the core and the initial velocity (m/s) of the ball satisfy the relationship:

−0.8 m/s≤(ball initial velocity−core initial velocity) ≤0 m/s.

4. The multi-piece solid golf ball of claim 1, wherein the envelope layer, the intermediate layer and the cover have respective thicknesses which satisfy the relationships:

envelope layer thickness≤cover thickness, and intermediate layer thickness≤cover thickness.

5. The multi-piece solid golf ball of claim 1, wherein the intermediate layer and the cover have respective specific gravities which satisfy the relationship:

cover specific≥gravity intermediate layer specific gravity.

6. The multi-piece solid golf ball of claim 1, wherein the intermediate layer is formed of a resin composition obtained by blending as essential components:

100 parts by weight of a resin component composed of, in admixture,
 (A) a base resin of (a-1) an olefin-unsaturated carboxylic acid random copolymer and/or a metal ion neutralization product of an olefin-unsaturated carboxylic acid random copolymer mixed with (a-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and
 (B) a non-ionomeric thermoplastic elastomer
in a weight ratio between 100:0 and 50:50;
 (C) from 5 to 80 parts by weight of a fatty acid and/or fatty acid derivative having a molecular weight of from 228 to 1500; and
 (D) from 0.1 to 17 parts by weight of a basic inorganic metal compound capable of neutralizing un-neutralized acid groups in components A and C.

7. The multi-piece solid golf ball of claim 1, wherein the envelope layer is formed of a thermoplastic polyether ester elastomer.

8. The multi-piece solid golf ball of claim 1, wherein the cover is formed of a resin composition obtained by blending together an ionomer resin and a granular inorganic filler.

9. The multi-piece solid golf ball of claim 1, wherein the envelope layer has a material hardness, expressed in terms of Shore D hardness, of from 27 to 40.

10. The multi-piece solid golf ball of claim 1, wherein the intermediate layer has a material hardness, expressed in terms of Shore D hardness, of from 50 to 60.

11. The multi-piece solid golf ball of claim 1, wherein the initial velocity (m/s) of the core and the initial velocity (m/s) of the envelope layer-encased sphere satisfy the relationship:

−1≤(envelope layer-encased sphere initial velocity− core initial velocity)≤0.

12. The multi-piece solid golf ball of claim 1, wherein the deflection (mm) of the core and the deflection (mm) of the ball satisfy the relationship:

0.6 mm≤(core deflection−ball deflection)≤1.2 mm, wherein each of the core deflection and ball deflection is the deflection (mm) of the core and the ball respectively when compressed under a final load of 1,275 N (130 kgf) from an initial load of 98 N (10 kgf).

13. The multi-piece solid golf ball of claim 1, wherein the deflection (mm) of the core and the deflection (mm) of the envelope layer-encased sphere satisfy the relationship:

−0.6 mm≤(core deflection−envelope layer-encased sphere deflection)≤0.5 mm.

14. The multi-piece solid golf ball of claim 1, wherein the cover specific gravity and the intermediate layer specific gravity satisfy the relationship:

0.05≤(cover specific gravity−intermediate layer specific gravity).

* * * * *